United States Patent
Mak-Fan et al.

(10) Patent No.: US 8,913,670 B2
(45) Date of Patent: Dec. 16, 2014

(54) SYSTEM AND METHOD FOR PROVIDING DYNAMIC DEBLOCKING FILTERING ON A MOBILE DEVICE

(75) Inventors: David Mak-Fan, Waterloo (CA); Aaron Bradley Small, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1480 days.

(21) Appl. No.: 11/842,344

(22) Filed: Aug. 21, 2007

(65) Prior Publication Data
US 2009/0052555 A1 Feb. 26, 2009

(51) Int. Cl.
H04N 7/26 (2006.01)
H04N 19/86 (2014.01)
H04N 19/117 (2014.01)
H04N 19/176 (2014.01)
H04N 19/61 (2014.01)
H04N 19/136 (2014.01)

(52) U.S. Cl.
CPC ....... *H04N 7/26888* (2013.01); *H04N 7/26058* (2013.01); *H04N 7/26244* (2013.01); *H04N 7/50* (2013.01); *H04N 7/26127* (2013.01)
USPC .................................... 375/240.29

(58) Field of Classification Search
USPC ................. 375/240, 240.29; 382/44
See application file for complete search history.

(56) References Cited

U.S. PATENT DOCUMENTS 5,847,771 A * 12/1998 Cloutier et al. ............... 348/564
6,724,944 B1 4/2004 Kalevo et al.
6,922,492 B2 7/2005 Yu et al.
2001/0020906 A1* 9/2001 Andrews et al. ................ 341/94
2002/0051496 A1* 5/2002 Hashimoto ............... 375/240.27
2003/0058944 A1* 3/2003 MacInnis et al. ......... 375/240.13
2003/0072375 A1* 4/2003 Soundararajan ......... 375/240.25
2004/0184549 A1* 9/2004 Webb ....................... 375/240.29
2004/0240549 A1* 12/2004 Cote et al. ................ 375/240.15

(Continued)

FOREIGN PATENT DOCUMENTS

WO WO 2005/101851 A1 10/2005
WO WO 2005/117445 A1 12/2005

OTHER PUBLICATIONS

Sima et al.; An efficient architecture for adaptive deblocking filter of H.264/AVC video coding; Published in: Consumer Electronics, IEEE Transactions on (vol. 50 , Issue: 1 ); Date of Publication: Feb. 2004; pp. 292-296; IEEE Xplore.*

(Continued)

*Primary Examiner* — Bradley Holder
(74) *Attorney, Agent, or Firm* — Brett J. Slaney; Blake, Cassels & Graydon LLP

(57) ABSTRACT

A system and method are provided that can be used for applying a deblocking filter to a video according to processor usage, in particular on a mobile device. To determine which of a plurality of deblocking filters to use, the system determines an environment indicator indicative of current processor usage, compares the environment indicator to a primary threshold, wherein the primary threshold is indicative of a maximum acceptable processor usage. If the primary threshold is met, the system foregoes any deblocking filtering. If however the primary threshold is not met, the environment indicator is compared to one or more secondary thresholds and a respective one of the plurality of deblocking filters is applied to the video according to which one of the secondary thresholds is met. Each of the plurality of deblocking filters has a different complexity and thus can be chosen to suit the current system environment.

22 Claims, 12 Drawing Sheets

(56) References Cited

U.S. PATENT DOCUMENTS

| | | | |
|---|---|---|---|
| 2005/0024651 A1* | 2/2005 | Yu et al. | 358/1.9 |
| 2005/0117653 A1* | 6/2005 | Sankaran | 375/240.24 |
| 2006/0008013 A1* | 1/2006 | Pelc et al. | 375/240.29 |
| 2006/0051068 A1* | 3/2006 | Gomila | 386/114 |
| 2006/0098744 A1* | 5/2006 | Huang | 375/240.29 |
| 2006/0126731 A1* | 6/2006 | Kim et al. | 375/240.03 |
| 2006/0227881 A1* | 10/2006 | Gordon | 375/240.25 |
| 2006/0262862 A1* | 11/2006 | Cheng et al. | 375/240.24 |
| 2006/0268985 A1* | 11/2006 | Liang et al. | 375/240.16 |
| 2007/0162776 A1 | 7/2007 | Carpenter et al. | |
| 2007/0177669 A1 | 8/2007 | Kawashima et al. | |
| 2007/0234088 A1* | 10/2007 | Marshall et al. | 713/320 |
| 2008/0043852 A1* | 2/2008 | Park et al. | 375/240.27 |
| 2008/0069247 A1* | 3/2008 | He | 375/240.29 |

OTHER PUBLICATIONS

Lin et al.; Efficient deblocking filter architecture for H.264 video coders; Published in: Circuits and Systems, 2006. ISCAS 2006. Proceedings. 2006 IEEE International Symposium on Date of Conference: May 21-24, 2006; pp. 2617-2620; IEEE Xplore.*

Bojnordi M. N. et al.;"An Efficient Deblocking Filter With Self-Transposing Memory Architecture for H.264/AVC"; Acoustics, Speech and Signal Processing 2006; ICASSP 2006 Proceedings; 2006 IEEE International Conference, Toulouse, France, May 14 to 19, 2006; May 14, 2006; pp. II-925 to II-928; IEEE; NJ, USA; ISBN: 1-4244-0469-X.

Kim, S. D. et al.; "A Deblocking Filter with Two Separate Modes in Block-Based Video Coding"; IEEE Transactions on Circuits and Systems for Video Technology; Feb. 1999; pp. 156 to 160; vol. 9, No. 1.

Kim, C.; "Adaptive post-filtering for reducing blocking and ringing artifacts in low bit-rate video coding"; Signal Processing: Image Communication; pp. 525 to 535; 2002; vol. 17; Elsevier Science B.V.

List, P. et al.; "Adaptive Deblocking Filter"; IEEE Transactions on Circuits and Systems for Video Technology,: pp. 614 to 619; Jul. 2003; vol. 13, No. 7.

Wan, S. et al.; "Perceptually adaptive joint deringing-deblocking filtering for scalable video transmission over wireless networks"; Signal Processing: Image Communication; pp. 266 to 276; 2007; vol. 22; Elsevier Science B.V.

Andreopoulos, Y. et al.; "Complexity-Constrained video Bitstream Shaping"; IEEE Transactions on Signal Processing; May 2007; pp. 1967 to 1974; vol. 55, No. 5; IEEE, New York, U.S.A.; ISSN: 1053-587X.

* cited by examiner

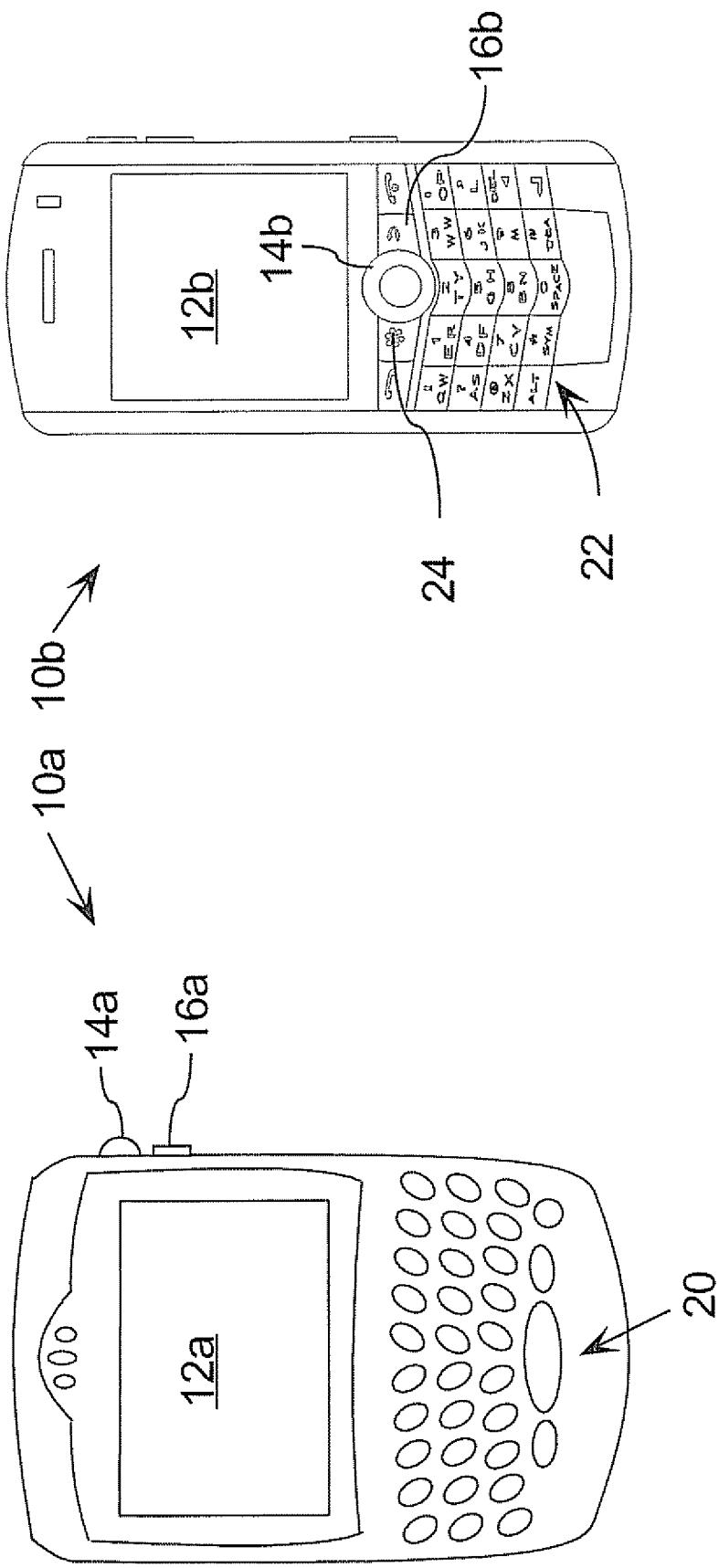

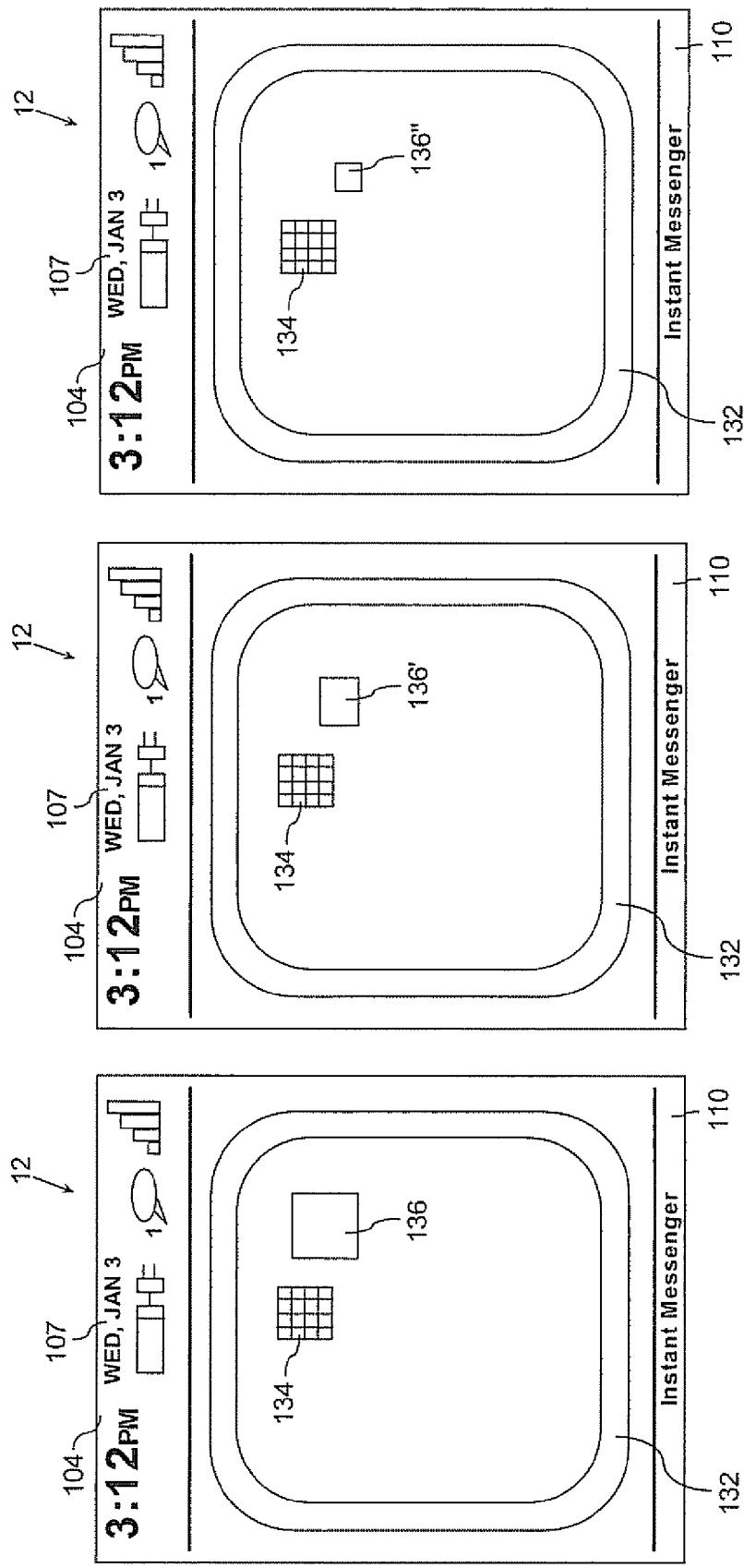

SYSTEM AND METHOD FOR PROVIDING DYNAMIC DEBLOCKING FILTERING ON A MOBILE DEVICE

TECHNICAL FIELD

The following relates to systems and methods for applying a deblocking filter to a video according to processor usage.

DESCRIPTION OF THE PRIOR ART

The widespread use of mobile devices and mobile wireless services and products, there has been a need for improved transmission and processing of electronically transmitted data such as for encoding, decoding, and post-processing at low bit-rate transmissions. In the case where the wirelessly transmitted media is video content, several technical problems may arise.

Wireless networks currently have relatively low bandwidth. Moreover, video communications often degrade because of multi-network fading, bandwidth variations, and packet loss. To resolve these issues, encoders are used to compress data at higher rates. Larger data compression, however, increases the amount of truncated data content because, e.g., the image's inter-block correlation is lost by block-based prediction, transformation, and quantization. Further, data compression adds noise (error) to the video stream. A video decoder, such as that configured for MPEG, decompresses the data on the receiving end. The decompressed data does not embody the full data set as the original file, leading to the formation of blocking artefacts (often large), also known as macroblocking. Blocking is the distortion that appears in compressed video material as abnormally large pixel blocks defined by sharp edges. These blocking artefacts appear because, during the decoder stage, surrounded pixels are averaged together to look like larger blocks. Blocking artefacts are predominately visible in low-bit rate environments such as those encountered by a mobile device and/or when streaming video.

In order to mitigate the blocking artefacts, a deblocking filter is either incorporated into the decoder, known as a loop filter, or appended at the end of decoder operations, known as a post filter. Both the loop and post filtering methods can be applied to a video. The deblocking filter improves the visual quality and prediction performance by smoothing sharp edges between blocks within decoded pictures.

Current deblocking filters differ in filtering complexity, which correlates with the ability to remove blocking artefacts without softening the entire picture. A highly complex deblocking filter that effectively removes blocking artefacts with minimal overall picture smoothing requires many CPU cycles, which may overload the computing system, especially for mobile devices that have somewhat limited processing capabilities and priorities. On the other hand, in most cases, simply not using a deblocking filter can cause undesirable distractions in the video.

It is therefore an object of the following to obviate or mitigate at least one of the above disadvantages.

BRIEF DESCRIPTION OF THE DRAWINGS

Embodiments will now be described by way of example only with reference to the appended drawings wherein:

FIG. 1 is a schematic diagram of a mobile device and a display screen therefor.

FIG. 2 is a schematic diagram of another mobile device and a display screen therefor.

FIG. 6 is a screen shot of a video player interface illustrating a blocking artefact.

FIG. 7 is a screen shot of the video player interface of FIG. 6 illustrating another blocking artefact.

FIG. 8 is a screen shot of the video player interface of FIG. 6 illustrating yet another blocking artefact.

DETAILED DESCRIPTION OF THE DRAWINGS

Figure 3:
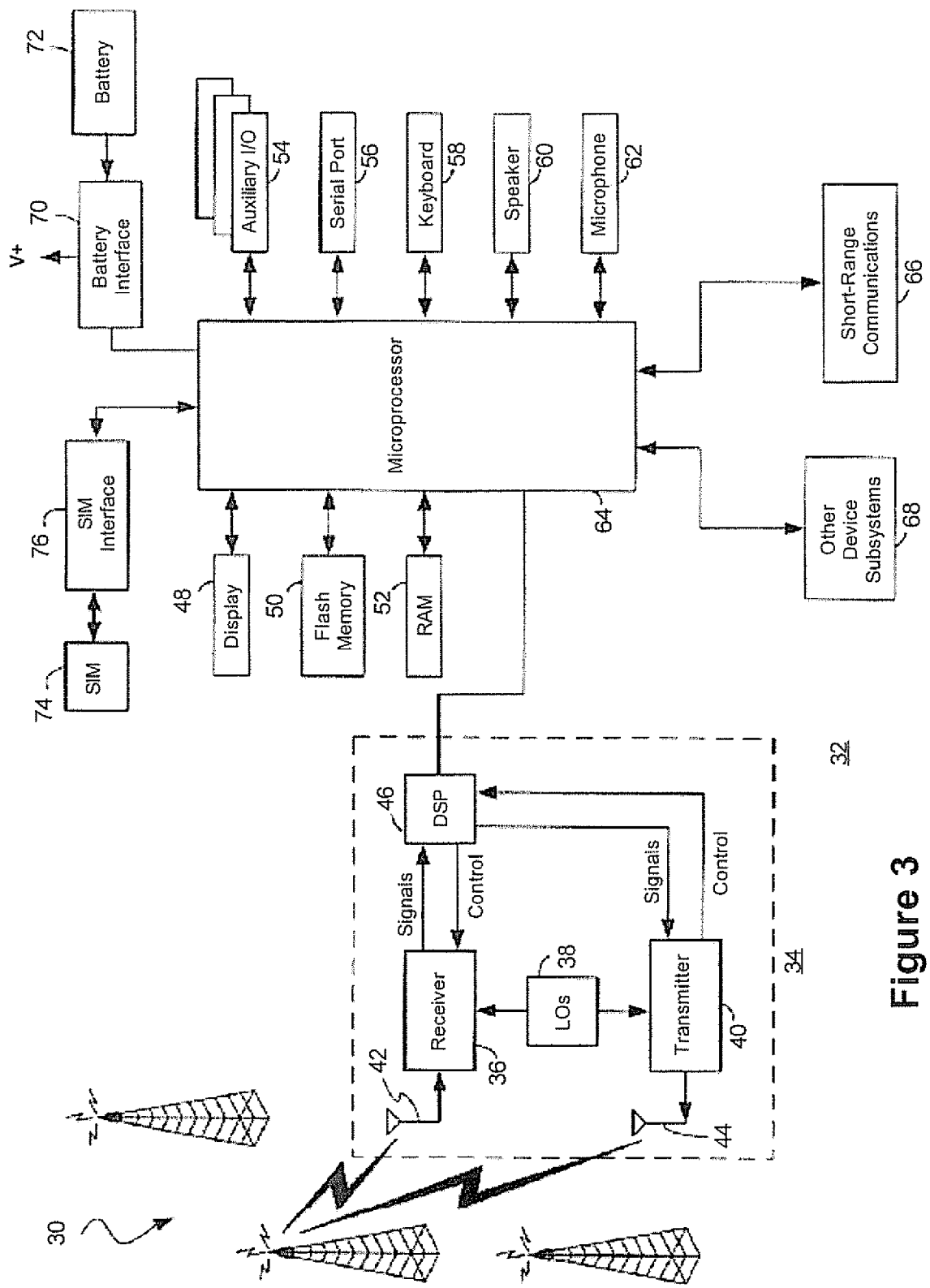
FIG. 3 is a schematic block diagram of components of the mobile device of any or both of FIGS. 1 and 2.

A processor, mobile device and method performed thereby are now described for dynamically selecting a suitable deblocking filter to be applied to a video stream as the content is decoded. The method is performed according to the current system environment, in particular processor usage, degradation of the decoding process, etc.

Referring now to FIGS. 1 and 2, one embodiment of a mobile device 10a is shown in FIG. 1, and another embodiment of a mobile device 10b is shown in FIG. 2. It will be appreciated that the numeral "10" will hereinafter refer to any mobile device 10, including the embodiments 10a and 10b. It will also be appreciated that a similar numbering convention may be used for other general features common between FIGS. 1 and 2 such as a display 12, a positioning device 14, and a cancel or escape button 16.

The mobile device 10a shown in FIG. 1 comprises a display 12a and the cursor or view positioning device 14 shown in this embodiment is a positioning wheel 14a. Positioning device 14 may serve as another input member and is both rotatable to provide selection inputs to the processor 238 (see FIG. 3) and can also be pressed in a direction generally toward housing to provide another selection input to the processor 238. The display 12 may include a selection cursor 18 that depicts generally where the next input or selection will be received. The selection cursor 18 may comprise a box, alteration of an icon or any combination of features that enable the user to identify the currently chosen icon or item. The mobile device 10a in FIG. 1 also comprises an escape or cancel button 16a and a keyboard 20. In this example, the keyboard 20 is disposed on the front face of the mobile device housing and positioning device 14 and cancel button 16a are disposed at the side of the housing to enable a user to manoeuvre the positioning wheel 16a while holding the mobile device 10 in one hand. The keyboard 20 is in this embodiment a standard QWERTY keyboard.

The mobile device 10b shown in FIG. 2 comprises a display 12b and the positioning device 14 in this embodiment is a trackball 14b. Trackball 14b permits multi-directional positioning of the selection cursor 18 such that the selection cursor 18 can be moved in an upward direction, in a downward direction and, if desired and/or permitted, in any diagonal direction. The trackball 14b is preferably situated on the front face of a housing for mobile device 10b as shown in FIG. 2 to enable a user to manoeuvre the trackball 14b while holding the mobile device 10b in one hand. The trackball 14b may serve as another input member (in addition to a directional or positioning member) to provide selection inputs to the processor 238 and can preferably be pressed in a direction towards the housing of the mobile device 10b to provide such a selection input.

The mobile device 10b also comprises a menu or option button 24 that loads a menu or list of options on display 12b when pressed, and a cancel or escape button 16b to exit, "go back" or otherwise escape from a feature, option, selection or display. The mobile device 10b as illustrated in FIG. 2, comprises a reduced QWERTY keyboard 22. In this embodiment, the keyboard 22, positioning device 14, escape button 16b and menu button 24 are disposed on a front face of a mobile device housing.

The reduced QWERTY keyboard 22 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "13" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter-" function in the fifth column.

The first row of five keys may comprise keys corresponding in order to letters "QW", "ER", "TY", "UT", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 10, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 10 etc.), or other whether presently known or unknown may be employed. Similarly, any variation of keyboard 20, 22 may be used. It will also be appreciated that the mobile devices 10 shown in FIGS. 1 and 2 are for illustrative purposes only and various other mobile devices 10, presently known or unknown are equally applicable to the following examples.

Movement, navigation, and/or scrolling with use of a cursor/view positioning device 14 (e.g. trackball 14b or positioning wheel 14a) is beneficial given the relatively large size of visually displayed information and the compact size of display 12, and since information and messages are typically only partially presented in the limited view of display 12 at any given moment. As previously described, positioning device 14—positioning wheel 14a and trackball 14b, are helpful cursor/view positioning mechanisms to achieve such movement. Positioning device 14, which may be referred to as a positioning wheel or scroll device 14a in one embodiment (FIG. 1), specifically includes a circular disc which is rotatable about a fixed axis of housing and may be rotated by the end user's index finger or thumb. As noted above, in another embodiment (FIG. 2) the trackball 14b comprises a multi-directional member that enables upward, downward and if desired, diagonal movements. The multi-directional movements afforded, in particular, by the trackball 14b and the presentation of icons and folder-s on display 12 provides the user with flexibility and familiarity of the layout of a traditional desktop computer interface. Also, the positioning device 14 enables movement and selection operations to be executed on the mobile device 10 using one hand. The trackball 14b in particular also enables both one-handed use and the ability to cause a cursor 18 to traverse the display 12 in more than one direction.

FIG. 3 is a detailed block diagram of a preferred mobile station 32 of the present disclosure. The term "mobile station" will herein refer to the operable components of, e.g. mobile device 10. Mobile station 32 is preferably a two-way communication device having at least voice and advanced data communication capabilities, including the capability to communicate with other computer systems. Depending on the functionality provided by mobile station 32, it may be referred to as a data messaging device, a two-way pager, a cellular telephone with data messaging capabilities, a wireless Internet appliance, or a data communication device (with or without telephony capabilities)—e.g. mobile device 10 shown in FIGS. 1 and 2. Mobile station 32 may communicate with any one of a plurality of fixed transceiver stations 30 within its geographic coverage area.

Mobile station 32 will normally incorporate a communication subsystem 34 which includes a receiver 36, a transmitter 40, and associated components such as one or more (preferably embedded or internal) antenna elements 42 and 44, local oscillators (LOs) 38, and a processing module such as a digital signal processor (DSP) 46. As will be apparent to those skilled in field of communications, particular design of communication subsystem 34 depends on the communication network in which mobile station 32 is intended to operate.

Mobile station 32 may send and receive communication signals over a network after required network registration or activation procedures have been completed. Signals received by antenna 44 through the network are input to receiver 36, which may perform such common receiver functions as signal amplification, frequency down conversion, filtering, channel selection, and like, and in example shown in FIG. 3, analog-to-digital (A/D) conversion. A/D conversion of a received signal allows more complex communication functions such as demodulation and decoding to be performed in DSP 46. In a similar manner, signals to be transmitted are processed, including modulation and encoding, for example, by DSP 46. These DSP-processed signals are input to transmitter 40 for digital-to-analog (D/A) conversion, frequency tip conversion, filtering, amplification and transmission over communication network via antenna 44. DSP 46 not only processes communication signals, but also provides for receiver and transmitter control. For example, the gains applied to communication signals in receiver 36 and transmitter 40 may be adaptively controlled through automatic gain control algorithms implemented in DSP 46.

Network access is associated with a subscriber or user of mobile station 32. In one embodiment, mobile station 32 uses a Subscriber Identity Module or "SIM" card 74 to be inserted in a SIM interface 76 in order to operate in the network. SIM 74 is one type of a conventional "smart card" used to identify an end user (or subscriber) of the mobile station 32 and to personalize the device, among other things. Without SIM 74, the mobile station terminal in such an embodiment is not fully operational for communication through a wireless network. By inserting SIM 74 into mobile station 32, an end user can have access to any and all of his/her subscribed services. SIM 74 generally includes a processor and memory for storing information. Since SIM 74 is coupled to a SIM interface 76, it is coupled to microprocessor 64 through communication lines. In order to identify the subscriber, SIM 74 contains some user parameters such as an International Mobile Subscriber Identity (IMSI). An advantage of using SIM 74 is that end users are not necessarily bound by any single physical mobile station. SIM 74 may store additional user information for the mobile station as well, including datebook (or calendar) information and recent call information. It will be appreciated that mobile station 32 may also be used with any other type of network compatible mobile device 10 such as those being code division multiple access (CDMA) enabled and should not be limited to those using and/or having a SIM card 74.

Mobile station 32 is a battery-powered device so it also includes a battery interface 70 for receiving one or more rechargeable batteries 72. Such a battery 72 provides electrical power to most if not all electrical circuitry in mobile station 32, and battery interface 70 provides for a mechanical and electrical connection for it. The battery interface 70 is coupled to a regulator (not shown) which provides a regulated voltage V to all of the circuitry.

Mobile station 32 in this embodiment includes a microprocessor 64 which controls overall operation of mobile station 32. It will be appreciated that the microprocessor 64 may be implemented by any processing device. Communication functions, including at least data and voice communications are performed through communication subsystem 34. Microprocessor 64 also interacts with additional device subsystems which may interface with physical components of the mobile device 10. Such addition device subsystems comprise a display 48, a flash memory 50, a random access memory (RAM) 52, auxiliary input/output subsystems 54, a serial port 56, a keyboard 58, a speaker 60, a microphone 62, a short-range communications subsystem 66, and any other device subsystems generally designated at 68. Some of the subsystems shown in FIG. 3 perform communication-related functions, whereas other subsystems may provide "resident" or on-device functions. Notably, some subsystems such as keyboard 58 and display 48, for example, may be used for both communication-related functions, such as entering a text message for transmission over a communication network, and device-resident functions such as a calculator or task list. Operating system software used by microprocessor 64 is preferably stored in a persistent store such as flash memory 50, which may alternatively be a read-only memory (ROM) or similar storage element (not shown). Those skilled in the art will appreciate that the operating system, specific device applications, or parts thereof, may be temporarily loaded into a volatile store such as RAM 52.

Microprocessor 64, in addition to its operating system functions, preferably enables execution of software applications on mobile station 32. A predetermined set of applications which control basic device operations, including at least data and voice communication applications, as well as the inventive functionality of the present disclosure, will normally be installed on mobile station 32 during its manufacture. A preferred application that may be loaded onto mobile station 32 may be a personal information manager (PIM) application having the ability to organize and manage data items relating to user such as, but not limited to, e-mail, calendar events, voice mails, appointments, and task items. Naturally, one or more memory stores are available on mobile station 32 and SIM 74 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 32 with respect to such items. This is especially advantageous where the host computer system is the mobile station user's office computer system. Additional applications may also be loaded onto mobile station 32 through network, an auxiliary subsystem 54, serial port 56, short-range communications subsystem 66, or any other suitable subsystem 68, and installed by a user in RAM 52 or preferably a non-volatile store (not shown) for execution by microprocessor 64. Such flexibility in application installation increases the functionality of mobile station 32 and may provide enhanced on-device functions, communication-related functions, or both. For example, secure communication applications may enable electronic commerce functions and other such financial transactions to be performed using mobile station 32.

In a data communication mode, a received signal such as a text message, an e-mail message, or web page download will be processed by communication subsystem 34 and input to microprocessor 64. Microprocessor 64 will preferably further process the signal for output to display 48 or alternatively to auxiliary I/O device 54. A user of mobile station 32 may also compose data items, such as e-mail messages, for example, using keyboard 58 in conjunction with display 48 and possibly auxiliary I/O device 54. Keyboard 58 is preferably a complete alphanumeric keyboard and/or telephone-type keypad. These composed items may be transmitted over a communication network through communication subsystem 34.

For voice communications, the overall operation of mobile station 32 is substantially similar, except that the received signals would be output to speaker 60 and signals for transmission would be generated by microphone 62. Alternative voice or audio I/O subsystems, such as a voice message recording subsystem, may also be implemented on mobile station 32. Although voice or audio signal output is preferably accomplished primarily through speaker 60, display 48 may also be used to provide an indication of the identity of a calling party, duration of a voice call, or other voice call related information, as some examples.

Serial port 56 in FIG. 3 is normally implemented in a personal digital assistant (PDA)-type communication device for which synchronization with a user's desktop computer is a desirable, albeit optional, component. Serial port 56 enables a user to set preferences through an external device or software application and extends the capabilities of mobile station 32 by providing for information or software downloads to mobile station 32 other than through a wireless communication network. The alternate download path may, for example, be used to load an encryption key onto mobile station 32 through a direct and thus reliable and trusted connection to thereby provide secure device communication.

Short-range communications subsystem 66 of FIG. 3 is an additional optional component which provides for communication between mobile station 32 and different systems or devices, which need not necessarily be similar devices. For example, subsystem 66 may include an infrared device and associated circuits and components, or a Bluetooth™ communication module to provide for communication with similarly enabled systems and devices. Bluetooth™ is a registered trademark of Bluetooth SIG, Inc.

Figure 4:
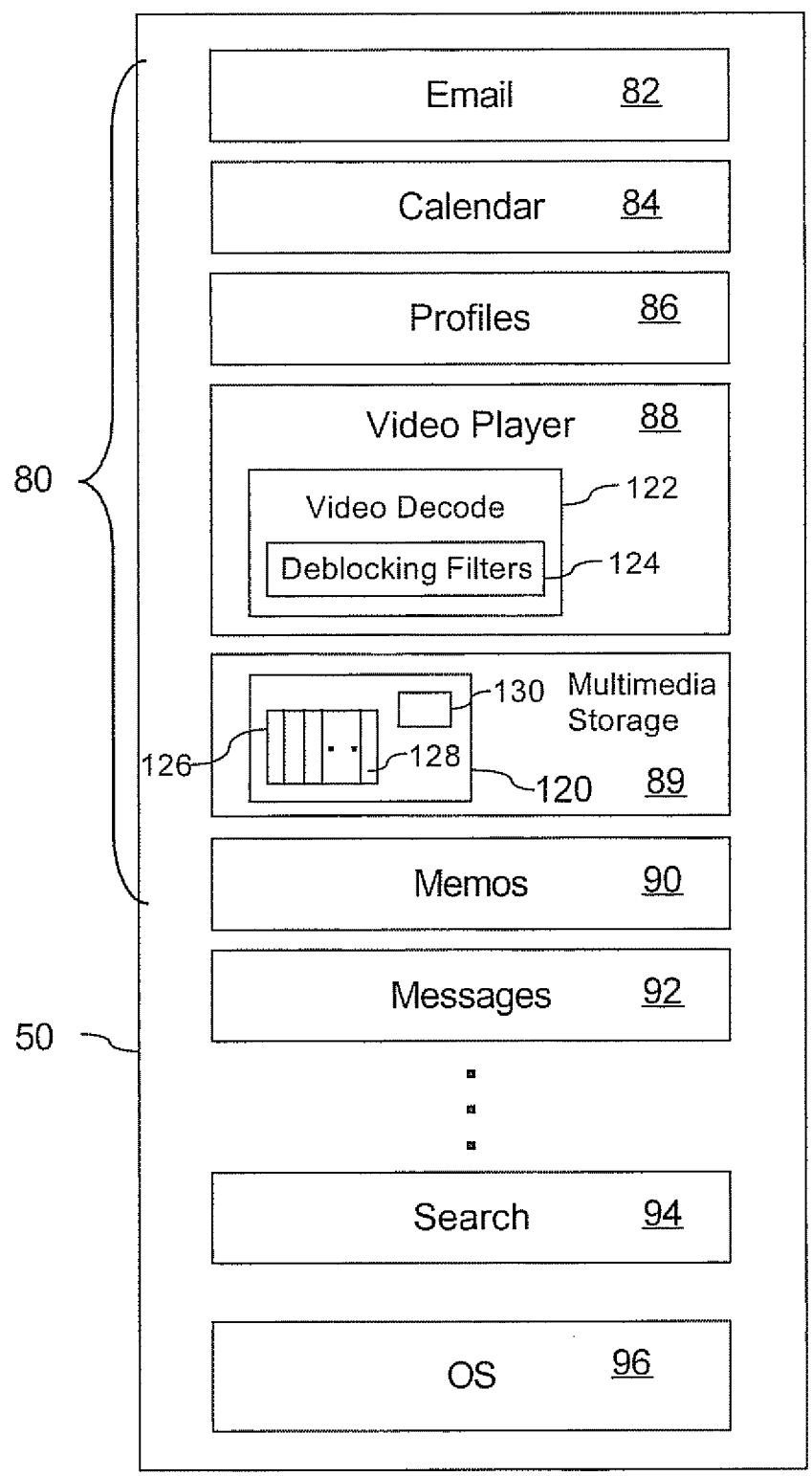
FIG. 4 is a schematic block diagram of the memory shown in FIG. 3.

As shown in FIG. 4, memory 50 includes a plurality of applications 80 associated with a series of icons 102 (see FIG. 5) for the processing of data. Applications 80 may be any variety of forms such as, without limitation, software, firmware, and the like. Applications 80 may include, for example, electronic mail (e-mail) 82, calendar program 84, storage and/or program for contacts 86, a multimedia/video player application 88, memo program 90, storage for messages 92, a search function and/or application 94 etc. An operating system (OS) 96, and in this embodiment a multimedia storage area 89 also reside in memory 50. The multimedia storage area 89 is generally a designated portion of memory 50 for storing multimedia files 120 that are used by the multimedia/video player 88. The multimedia/video player 88 will hereinafter, for brevity, be referred to as a 'video player 88' (as shown in FIG. 4).

As can also be seen in FIG. 4, the video player 88 includes a video decode module 122 for decoding multimedia content and one or more deblocking filters 124 for dynamically filtering blocking artefacts. A deblocking filter 124 increases the video image's video quality through a process of reducing the sharpness at the edges of a blocking artefact.

Figure 12:
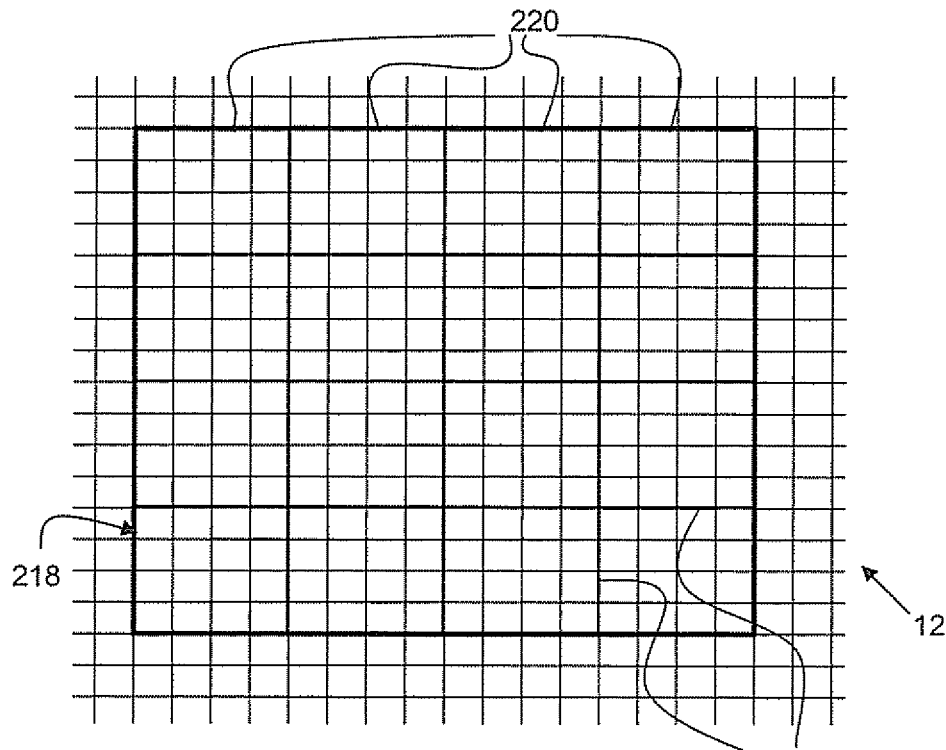
FIG. 12 is a representation of a macroblock appearing on a display of the mobile devices of FIGS. 1 and 2.
Figure 13:
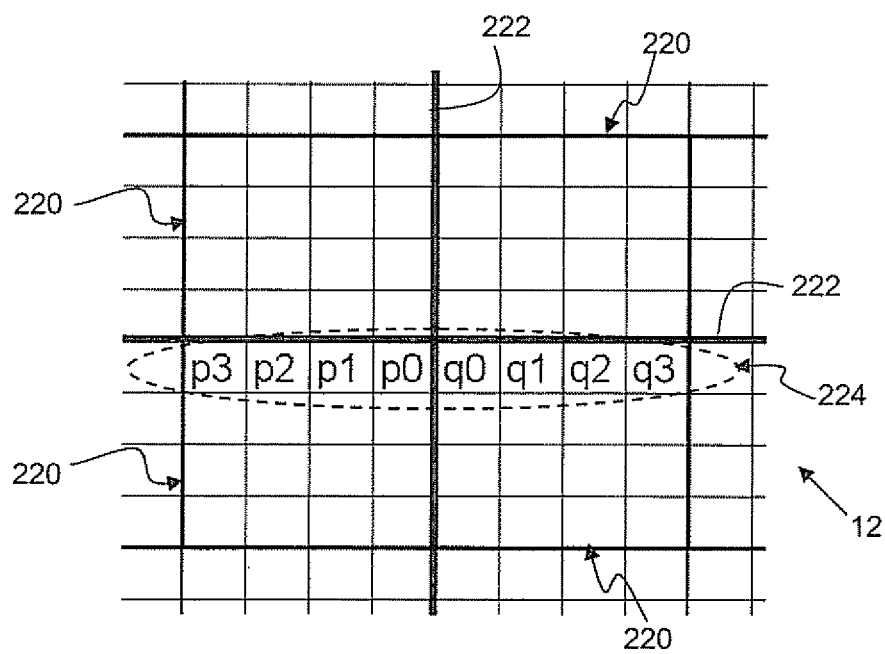
FIG. 13 shows a pixel block of the macroblock shown in FIG. 12.

A typical deblocking filtering process is implemented block-wise according to the same pixel structures defined by the video image coding systems. As exemplified in FIGS. 12 and 13, deblocking is performed on a macroblock 218 that appears on a mobile device's display 12, where each macroblock is selected in a raster scan order. In a raster scan, an image is cut into successive samples called pixels along scan lines 224. Each scan line 224 can be transmitted to the display screen or stored as a row of pixel values in an array. After each scan line, the position of the scan line advances downward for vertical scanning, or across for horizontal scanning. This ordering of pixels by rows is known as raster scan order. In this example, a macroblock 218, which contains 16×16 pixels, has been divided into sixteen 4×4 pixel blocks 220, as standardized according to the H.264 image coding system. Other variations may include larger 8×8 pixel blocks. The deblocking filter 124 is applied on the boundary 222 between two 4×4 blocks resident within the macroblock 218. The filter moves in both directions: horizontal filtering is applied to vertical edges and vertical filtering is applied to horizontal edges.

Figure 14:
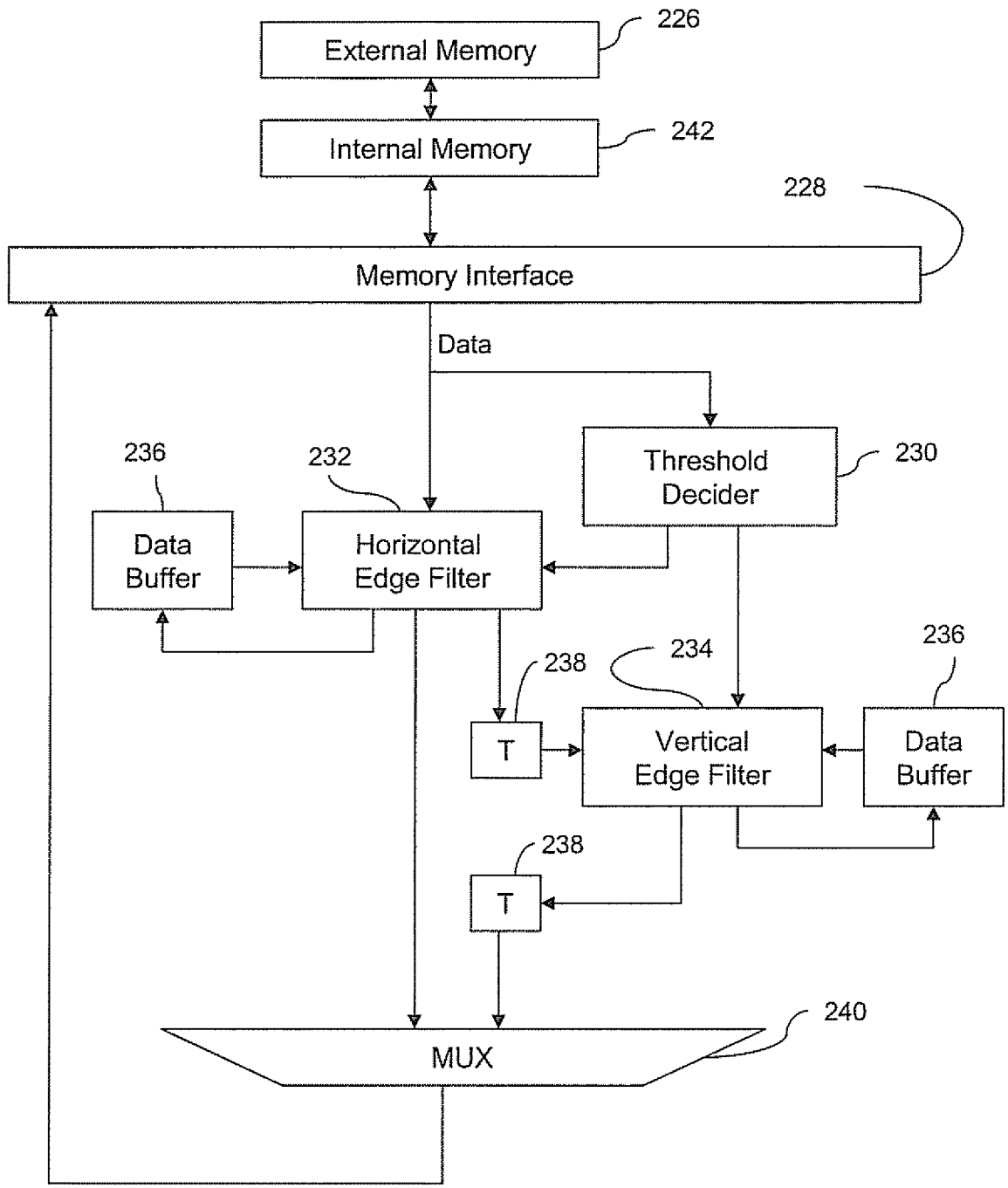
FIG. 14 is a schematic diagram illustrating functional components of a deblocking filter.

The deblocking filters 124 shown in FIG. 4 may have the generic structure shown in FIG. 14. The elements of this structure may be increased or decreased in quantity and rearranged to vary the filter's performance. The input data, in this case a video file, obtained from an external memory 226 is sent to an internal memory 242 of the deblocking filter 124. A memory interface 228 distributes the data, such that input data is send to a horizontal edge filter 232 and a threshold decider 230.

Figure 15:
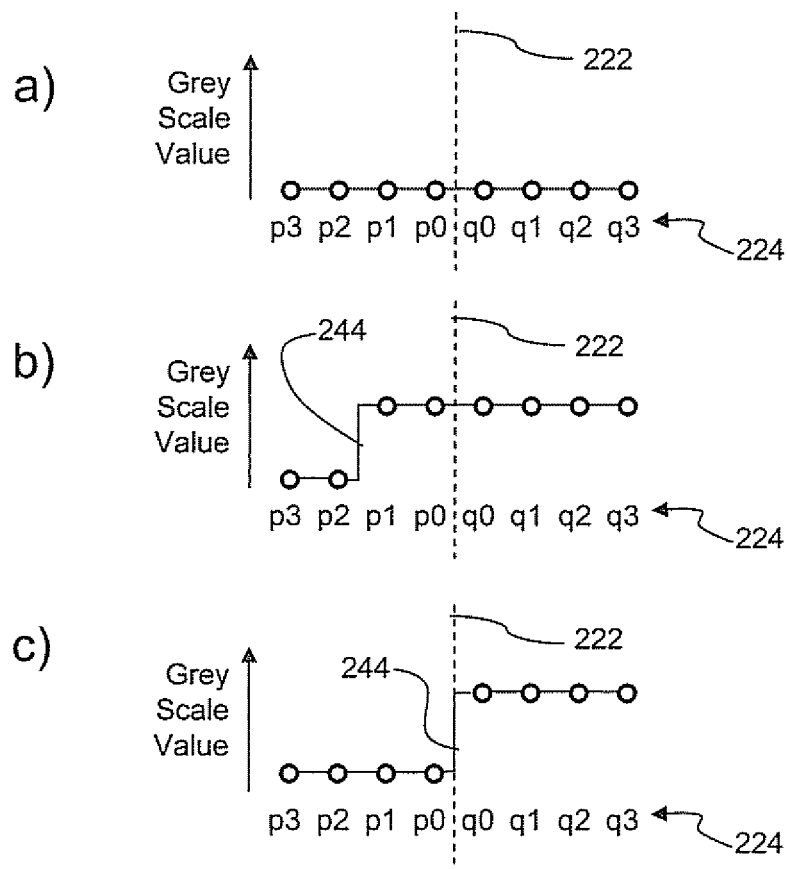
FIGS. 15a-15c illustrates various scan lines of a boundary of a macroblock.

The threshold decider 230 determines the complexity of the filtering scheme based on the activity surrounding the boundary 222. As shown in FIG. 15, there are several configurations of the scan line with respect to grey scale value. FIG. 15a shows a flat pixel vector which does not require filtering. FIG. 15b shows a difference 244 in pixel values inside the block, which represents an edge from the original image as opposed to an edge created by the blocking effect, and therefore does not require filtering. FIG. 15c shows a difference 244 of grey scale values across the block boundary 222, creating a situation where filtering is required.

The threshold decider 230 is also often referred to as a Boundary strength unit, which is used to determine a Boundary strength (Bs) value. Every edge between two 4×4 blocks is assigned Bs values that varies from Bs=4 for strong filtering to Bs=0 for no filtering. Intermediate parameters, $\alpha$ and $\beta$, which are calculated using quantization values, are used to determine the Bs value in conjunction with pixel values. For example, referring to FIG. 13, in one embodiment, a filter is selected when $|p0-q0|<\alpha$ and $|p1-p0|<\beta$ and $|q1-q0|<\beta$ hold true, or else control logic selects Bs=0 such that no filter is applied. This mathematical relationship analyzes the gradient at the edge and determines whether or not the edge should be preserved; the edge is preserved when Bs=0 and no filter is applied. Conceptually, the Bs value depends on coding mode, existence of nonzero residual transform coefficients, and motion vectors on both sides of the boundary.

Figure 16:
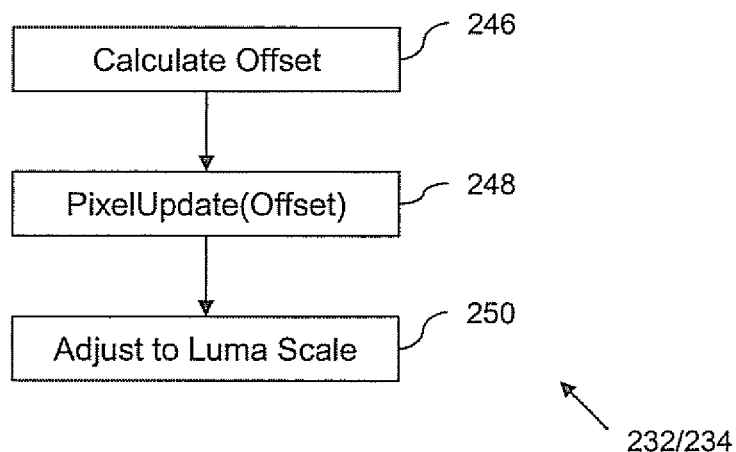
FIG. 16 is a flow diagram illustrating operation of an edge filter.
Figure 17:
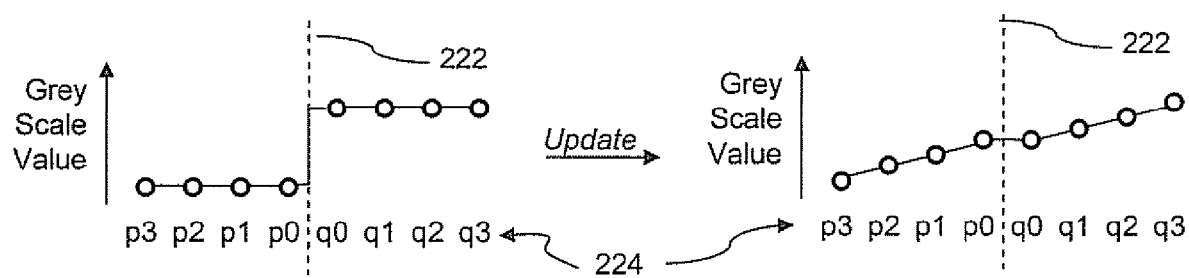
FIG. 17 illustrates the creation of an updated scan line.

The threshold decider 230 determines the level of edge filtering to be used for both the horizontal 232 and vertical edge filter 234. Both edge filters follow a generic form, shown in FIG. 16. First, the difference between the pixels at the boundaries 222 is calculated. This difference, or offset 246, is used to update 248 the surrounding pixels. In one specific situation, the updated scan line may take the form shown in FIG. 17. The updating algorithm will vary according to the Bs value calculated by the threshold decider 230. During the updating process, data will be temporarily stored and retrieved to and from the data buffer 236. The updated pixels are then normalized 250 according to the luma scale between the values 0 to 255.

The output from the horizontal edge filter 232 is sent to a transpose model 238 to support vertical filtering of the horizontal edges. The edge filter algorithm is similarly applied as before in the vertical edge filter 234. The output from the vertical edge filter 234 is transposed again before being sent to the multiplexer (MUX) 240. The MUX 240 selects the appropriate transmission paths to output the filtered video data.

Variations of deblocking filters 124 include the use of one or more edge filters, different arrangements of horizontal and vertical filtering, and the increased number of multiplexers. Further, different algorithms may be used to select the filtering scheme, which can take into account the spatial activity of the local pixels. Alternatives to the edge filter method also include low and high pass filters, statistical estimators, and set-theoretic construction methods. It can be therefore seen that the structure and complexity of a deblocking filter 124 can vary and it has been realized that difference complexities should be applied at different times, according to system load. Accordingly, several deblocking filters 124 are used herein and selected dynamically as discussed below.

The complexity of the deblocking filter 124 depends on the variation within the architecture and the nested algorithms. For example, a deblocking filter 124 that makes use of two edge filters 232, 234 is more complex than one that uses a single edge filter 232. Similarly, a threshold decider 230 that consists of an algorithm that computes many image variables is likely more complex than an algorithm that considers a pair of image characteristics. Further, the addition of other components and different arrangements of the components within a deblocking filter 124, including but not limited to data buffers 236, MUXs 240, and transpose models 238, may increase the complexity of a deblocking filter 124. Naturally, the increased complexity requires a larger number of instructions to be processed by the computing device's processor 64, which also directly increases the number of processor clock cycles. A higher complexity deblocking filter 124 therefore consumes more processing power and may require more time to execute, while a lower complexity deblocking filter 124 consumes less processing power and may require less time to execute. It can thus be seen that using deblocking filters 124 having different complexities can directly affect processor usage and, in turn, affect (improve or degrade) overall system load.

In the case where video is being decoded, a higher complexity deblocking filter 124 would more successfully increase the visual quality of the video image in contrast to a lower complexity deblocking filter 124. However, as noted, a more complex deblocking filter 124 consumes more processing power, which may reduce the processor's 64 ability to decode consecutive video flames at a desired frame rate. This may produce choppy video images, which can be equally or more visually distracting to the user in comparison to blocking artefacts 136. Therefore, a deblocking filter 124 that is overly complex, considering the available processing resources, will saturate the processor's 64 capabilities and lead to pool video images. Alternatively, a low complexity deblocking filter 124 would not likely over consume processor resources, although would likely produce lower quality images. As such, a dynamic method is used to select an appropriate deblocking filter 124 to simultaneously achieve faster video processing speeds and improved image quality results, which will be explained in detail below.

Returning to FIG. 4, in addition to the video player 88 and its deblocking filters 124, the mobile device's memory 50 holds one or more multimedia files 120 that are stored in the multimedia storage portion 89. These multimedia files 120 are configured to be used with the video player 88 and are dynamically filtered for blocking artefacts using the deblocking filters 124. Multimedia files 120 are typically stored in a compressed (encoded) form that must be decompressed (decoded) by the processor 64 in order to be played on the video player 88. It will be appreciated that the multimedia files 120 may be loaded from an external source through a web browser or downloaded from a web site accessed through the communication system 30 or the video content may be streaming to the mobile device 10, and need not be stored directly on the mobile device 10. The multimedia files 120 comprise of video data 126, also referred to herein as video content or a video stream, which includes a series of frames 128. The files 120 also indicate a desired or target frame rate 130, which is the preferable frame rate for that particular video.

In one embodiment, the video data stream 126 is encoded using MPEG video encoding, e.g. MPEG-4; it will be appreciated, however, that the principles discussed below are equally applicable to other encoding/decoding schemes. In MPEG video encoding, a group of pictures is used to specify the order in which intra-frame and inter-frames are arranged, wherein the group of pictures is a stream of encoded frames in the video data stream 126. The frames 128 in MPEG encoding are of the following types: An I-frame (intra coded) corresponds to a fixed image and is independent of other picture types. Each group of pictures begins with this type of frame. A P-frame (predictive coded) contains difference information from the preceding or P-frame. A B-frame (bidirectionally predictive coded) contains difference information from the preceding and/or following I or P-frame. D frames may also be used, which are DC direct coded pictures that serve the fast advance. In the following examples, video data stream 126 having I, B and P frames is used. It will be appreciated that the dynamic filtering discussed below may be applied on a frame by frame basis or for every group of pictures. For ease of explanation, the principles discussed below will operate on a frame by frame basis.

Figure 5:
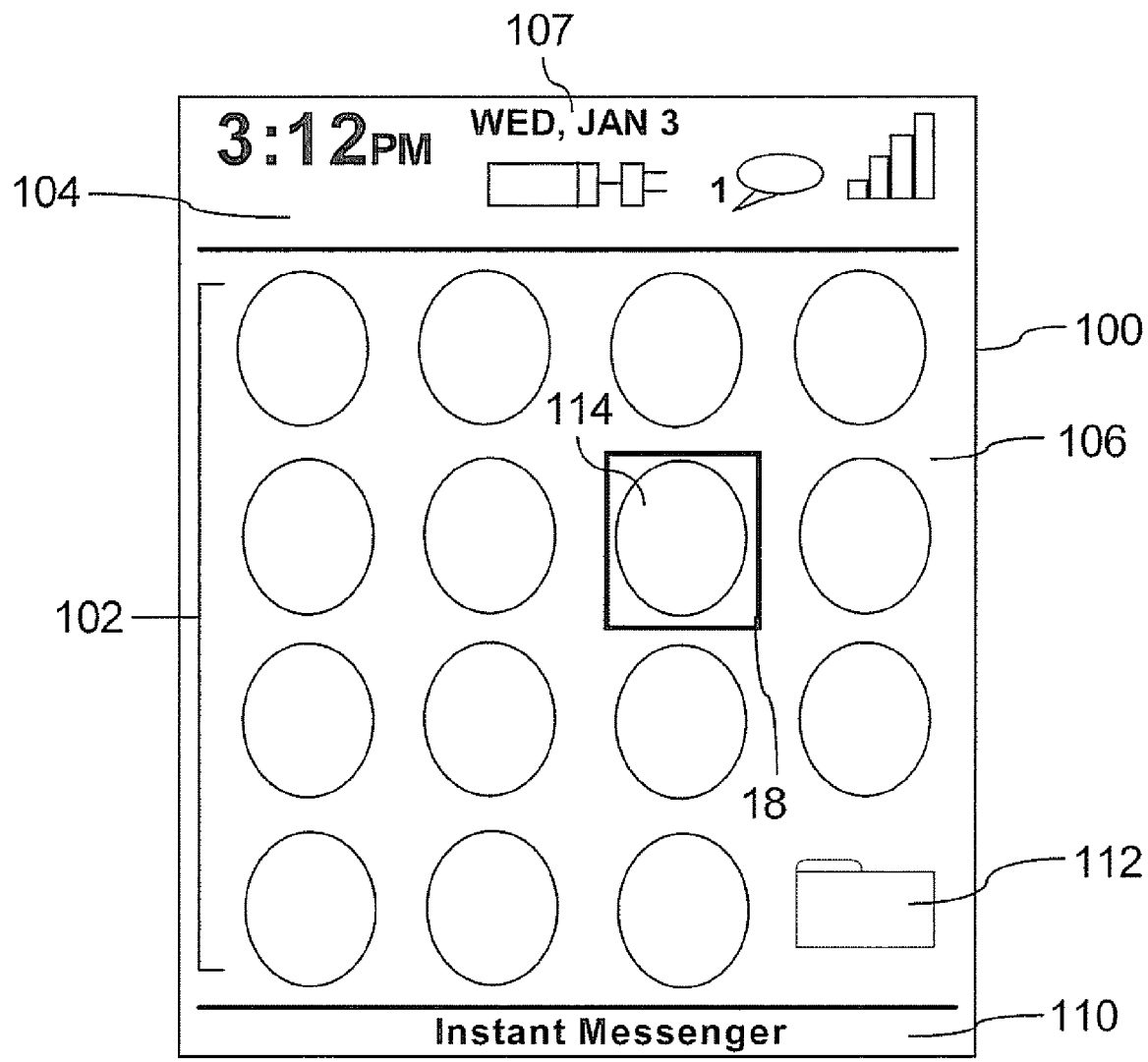
FIG. 5 is a screen shot of a home screen for the mobile device of any or both of FIGS. 1 and 2.

Turning now to FIG. 5, the mobile device 10 displays a home screen 100, which is preferably the active screen when the mobile device 10 is powered up and constitutes the main ribbon application. The home screen 100 generally comprises a status region 104 and a theme background 106, which provides a graphical background for the display 12. The theme background 106 displays a series of icons 102 in a predefined arrangement on a graphical background.

In some themes, the home screen 100 may limit the number icons 102 shown on the home screen 100 so as to not detract from the theme background 106, particularly where the background 106 is chosen for aesthetic reasons. The theme background 106 shown in FIG. 5 provides a grid of icons. In other themes (not shown), a limited list of icons may be displayed in a column (or row) on the home screen along one portion of the display 12. In yet another theme, the entire list of icons may be listed in a continuous row along one side of the home screen on the display 12 enabling the user to scroll through the list while maintaining a limited number of currently visible icons on the display 12. In yet another theme (not shown), metadata may be displayed with each of a limited number of icons shown on the home screen. For example, the next two appointments in the user's calendar may be accessed by the processor 64 and displayed next to the calendar icon. It will be appreciated that preferably several themes are available for the user to select and that any applicable arrangement may be used.

One or more of the series of icons 102 is typically a folder 112 that itself is capable of organizing any number of applications therewithin.

The status region 104 in this embodiment comprises a date/time display 107. The theme background 106, in addition to a graphical background and the series of icons 102, also comprises a status bar 110. The status bar 110 provides information to the user based on the location of the selection cursor 18, e.g. by displaying a name for the icon 102 that is currently highlighted.

Accordingly, an application, such as a video player application 88 may be initiated (opened or viewed) from display 12 by highlighting a video player icon 114 using the positioning device 14 and providing a suitable user input to the mobile device 10. For example, video player application 88 may be initiated by moving the positioning device 14 such that the contacts icon 114 is highlighted as shown in FIG. 5, and providing a selection input, e.g. by pressing the trackball 14b.

Turning now to FIG. 6, a video player interface 132 is shown, which is displayed on display 12 upon initiating the video player application 88. Within the interface 132, decoded video content is displayed FIG. 6 shows the general arrangement of pixels 134 that define the content of a video frame 128. A blocking artefact 136 is also shown, which, as can be seen, is substantially larger than an individual pixel 134 in this example and, as explained above, may cause a distraction for the user as they watch the video. FIG. 6 generally shows a condition where either a very low-complexity deblocking filter 124 is used, or where a deblocking filter 124 is not used or is 'turned off'.

FIG. 7 shows the same video player interface 132, a reduced blocking artefact 136' that uses a slightly more complex deblocking filter 124 when compared to that shown in FIG. 6.

FIG. 8 shows yet another reduced blocking artefact 136", which is closer to the actual pixel size and thus does not appear as distracting as it would appear more or less similar to a regular pixel. This may be a result of having been processed by a more complex deblocking filter 124 than the previous filters or because the artefact itself is not as bad at that time. For the purposes of illustrating the principles below, it is assumed that the artefact 136 shown in FIGS. 6-8 is the same artefact processed according to three different blocking filters 124 having differing levels of complexity and being applied according to different system environments at the time of performing the deblocking filtering.

Figure 9:
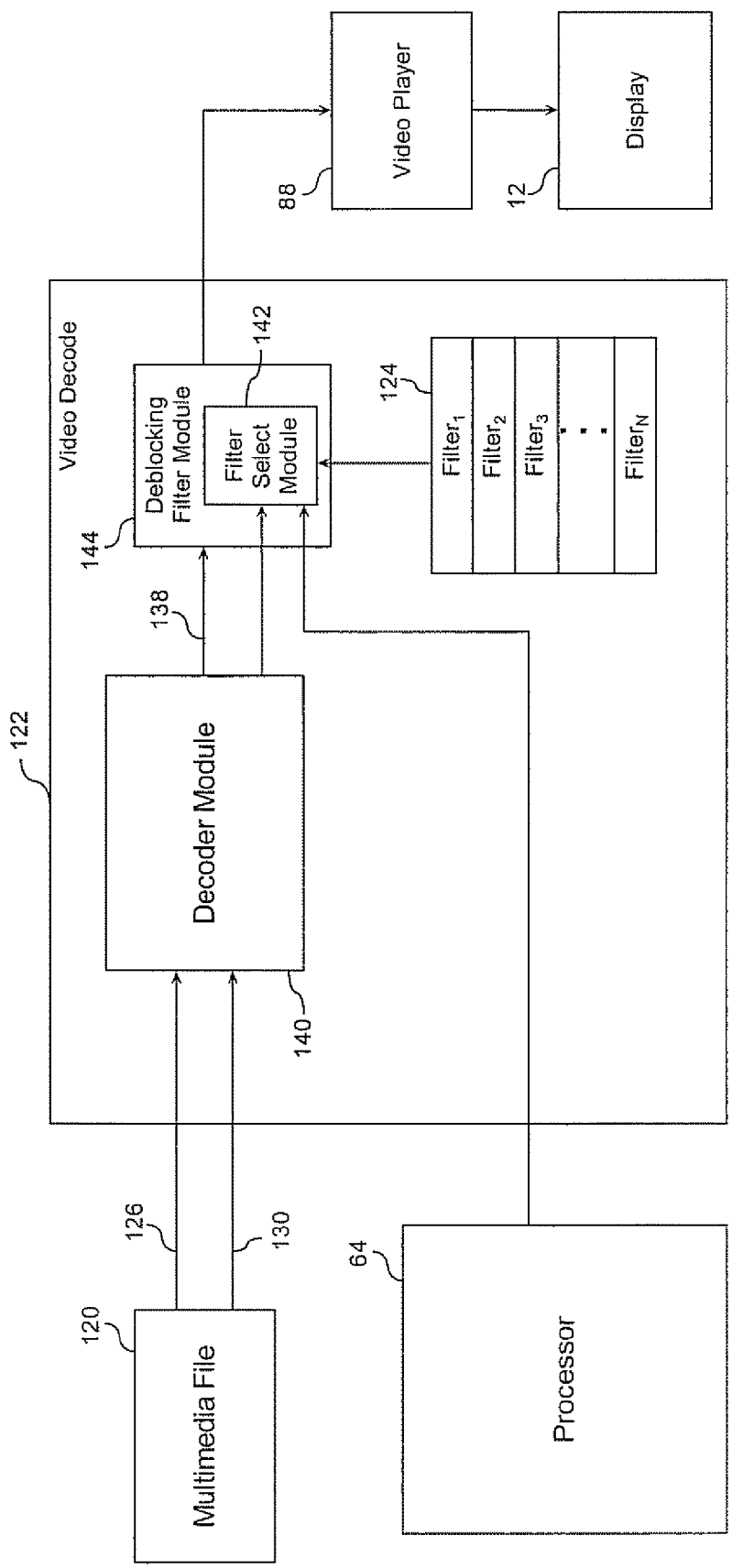
FIG. 9 is a schematic block diagram of the video decode module shown in FIG. 4.

The video decode module 122 is shown in greater detail in FIG. 9. The video decode module 122 comprises a decoder module 140 for decoding the video data 126, preferably according to the target frame rate 130. The video data 126 and target frame rate 130 are obtained by accessing the associated multimedia file 120 stored in memory 50. The decoder module 122 outputs decoded video content 138, which is processed by a deblocking filter module 144. The deblocking filter module 144 outputs filtered video content 139, which is played by the video player 88 on the display 12 of the mobile device 10. The deblocking filter module 144 also comprises a filter select module 142 which monitors the processor 64 to ascertain processor usage. The processor usage, as well as the current status of the decode frame rate and any compensation algorithms being applied obtained from the decoder module 140, are used to select a particular one of a plurality of (e.g. N) deblocking filters 124, e.g. Filter$_1$, ..., Filter$_N$. The choice of which deblocking filter 124 to apply is based on the current system environment as determined by the filter select module 142.

It will be appreciated that the deblocking filters 124 may be either N separate filters with fixed parameters or an adjustable/tunable filter that can be set in N different ways according to N different sets of parameters. Although the following examples illustrate the case where there are N fixed filters, the variability of these filters may instead be offered by one filter that is dynamically set according to the current environment according to the same principles discussed herein.

Figure 10:
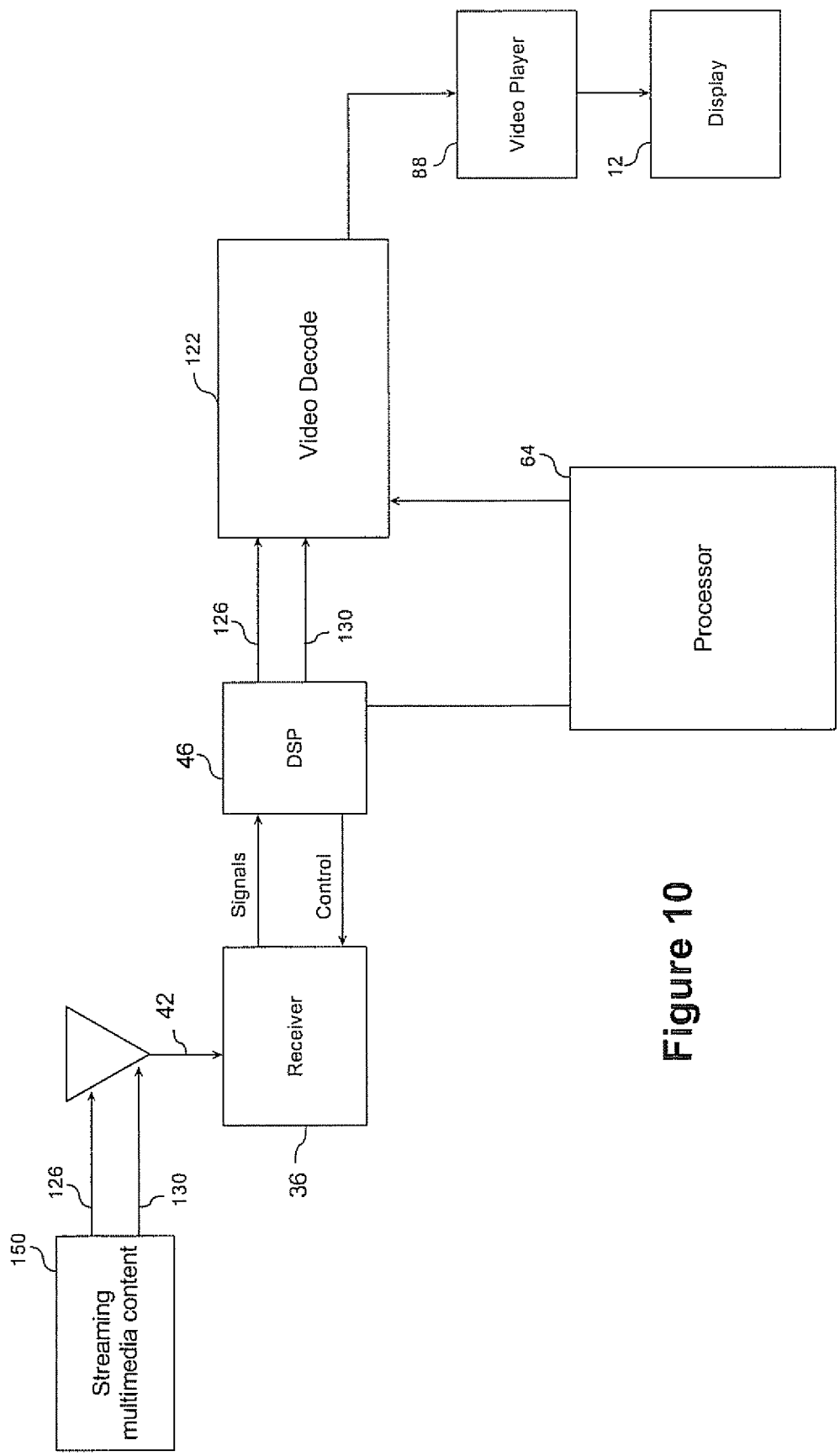
FIG. 10 is a schematic block diagram showing an embodiment for streaming media content.

It will also be appreciated that the multimedia file 150 may be streaming content that is provided to or otherwise obtained by the mobile device 10. FIG. 10 illustrates an embodiment where the multimedia file 150 streams over a network and is received by the antenna element 42 and in turn the receiver 36. The streaming data is then processed by a Digital Signal Processor (DSP) 46 and passed to the video decode module 122. It will be appreciated that the video decode module 122 in FIG. 10 is identical to the video decode module shown in FIG. 9 and described above and thus details thereof need not be reiterated.

Figure 11:
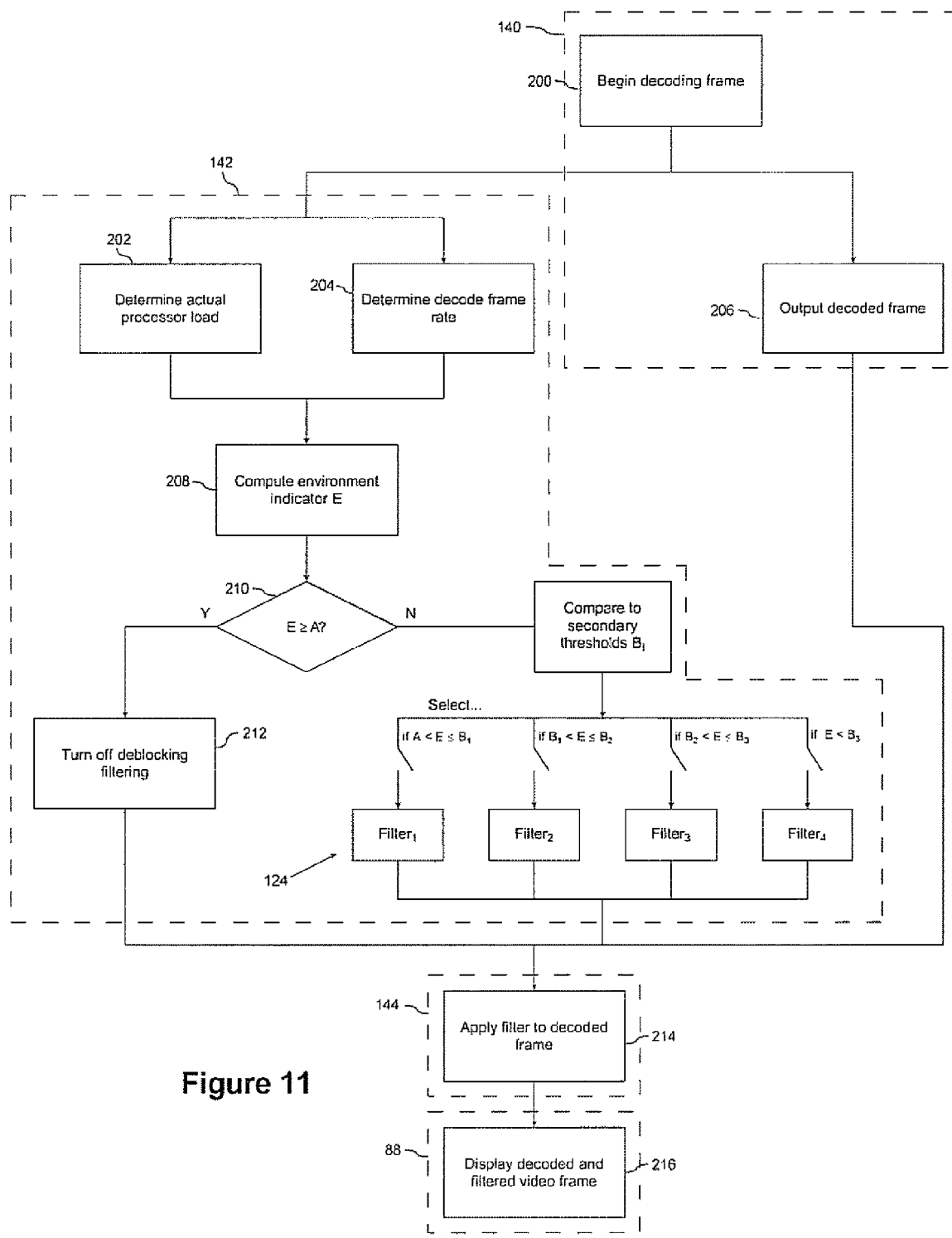
FIG. 11 is a flow diagram showing a procedure for dynamically selecting a deblocking filter.

Turning now to FIG. 11, a flow diagram illustrating operation of the filter select module 142 for instructing the configuration module 146 is shown. In FIG. 11, the dotted lines generally identify which component shown in FIG. 9 is preferably responsible for the delineated steps/operations. As noted earlier, the filter select module 142, monitors the current environment, and determines and selects the appropriate deblocking filter 124 to ideally achieve better video processing speeds and improved image quality results or at least balance the competing objectives. At step 200, the decoder module 140 begins decoding a frame 128 and the decoder module 140, once the frame 128 has been decoded, outputs the decoded frame at step 206. Preferably while the frame 128 is being decoded, the filter select module 142 determines the actual processor load at step 202 by querying statistics from the kernel which keeps track of thread activity information for the processor 64, and may also determine the decode frame rate from the decoder module 140 at step 204 if this information is suitable for assessing the current system environment. For example, the current decode frame rate can be used to determine expected changes in processor load, which may affect the choice of the deblocking filter 124. If the current frame rate is higher or lower than the target frame rate 130, this may indicate that a compensation procedure is being used that will either increase or decrease the frame rate such that the processor usage will be affected now and in the future. However, in some cases, where the frame rate is also controlled according to system load, the same logic can be used for both adjusting the frame rate and choosing a deblocking filter 124. If the system load is not as accessible in another embodiment, the frame rate may be another convenient way to indirectly assess system load. This could apply to a device that has hardware accelerated decoding, where it is more difficult to query a coprocessor which does video decoding. However, it is possible to determine how quickly the coprocessor is decoding in time and thus frame rate.

Other parameters of the decoding process may also be referenced to better determine if future processor usage is expected to increase or decrease. For example, since B-frames are more complex than P or I frames, it is also possible to ascertain if there will be a B-frame to decode in the future because of the order that the frames arrive in the bitstream. In such a case, it is known that the complexity of the decoding process is about to increase (there are more frames to decode in less time until the B-frame has been displayed). Therefore, when the decoding of a B-frame is anticipated (due to the ordering of the bitstream), if the system is close to a particular limit, the complexity of the deblocking filtering can be reduced immediately. In other words, the expected order of the frames can be used to 'look ahead' or perform predictive dynamic deblocking filtering. Another parameter that can be referenced is when a user seeks/fast forwards etc. In these cases, it is desirable to decode as quickly as possible at the cost of some quality (especially in the fast-forward scenario). Yet another possibility is to set the complexity of the deblocking filtering according to the frame 128 that is about to be decoded rather than just basing the choice of filter only on system load. For example, I-frames should be decoded with the highest accuracy (the best deblocking), which is fortunate because I-frames are generally the easiest to decode. The changes in P and B frames that are based on motion vectors do not typically need as complex deblocking. As such, the thresholds for selecting the deblocking filters (see more detail below) could be adjusted according to what is being decoded, or to bias the decision for which deblocking filter to use based on the frame 128.

It may therefore be seen that at steps 202 and 204 the filter select module 142, in a general sense, gathers data pertaining to the current system environment to assist in determining which level/complexity of deblocking filter to use.

The processor load data and decode frame rate data determined at steps 202 and 204 respectively, are used to compute a system environment indicator E at step 208. The environment indicator E is an intermediary parameter used by the filter select module 142 that represents the current state of the computing device and is used to select an appropriate deblocking filter mode and in turn a respective one of the deblocking filters 124. In one embodiment, as exemplified by FIG. 11, the higher the system environment indicator E value, the higher the overall system and processor load at that time. The amount of processor load being used also indicates the amount processing resources that are available for the deblocking filtering process. For example, when the environment indicator E value is relatively low, a less complex deblocking filter 124 can be used to improve visual image quality without overloading processor resources, since there is relatively more processor resources available at that time. As such, it can be appreciated that the dynamic deblocking filtering algorithm uses the environment indicator E to take into account the current processor load, current decode frame rate, and target decode frame rate 130 to dynamically choose the most appropriate deblocking filter 124.

The computed environment indicator E is then compared to several thresholds in order to select the most appropriate deblocking filter 124. The environment indicator E is first compared with a preliminary threshold A at step 210 to determine if there is enough processor power available to even apply deblocking filtering.

In general, the preliminary threshold represents an upper limit with respect to processor load, namely at what point deblocking filtering cannot be performed without completely saturating the processor 64. The threshold A is based on the amount of processor time dedicated to idle tasks and other applications 80. Setting this threshold low makes the video decoding smoother, whereas setting it high makes applications more responsive. The threshold A can vary based on the nature of the mobile device 10 and what applications 80 and features are generally available. The threshold should be chosen so that the mobile device 10 is responsive and the processor time is balanced. In this example, if the environment indicator E meets a particular threshold, in this example, if it is greater than or equal to the threshold A, the required image processing power exceeds the available processing resources. When this is true, then the deblocking filter function is turned off in step 214 (i.e. no deblocking filter 124 is used).

Alternatively, returning to step 210, if the environment indicator E does not meet the threshold A, the environment indicator E is evaluated at step 212 by comparing it against a set of secondary thresholds $B_i$, one corresponding to each deblocking filter 124 that may be selected. It should be noted that in this example, the most complex deblocking filter (Filter$_N$) would not require a threshold $B_N$ since when the processor load is at or below a certain threshold, the most complex filter available to the filter module 144 would always be selected. Each secondary threshold $B_i$ represents a setpoint for total current processor usage that would be acceptable for the corresponding filter 124. Preferably, the secondary thresholds are evaluated in descending order such that the higher the 'i' value for the threshold, the higher the complexity of the deblocking filter 124 as the desired complexity of the filter 124 is generally inversely related to the processor load. At step 212, the environment indicator E is compared against each secondary threshold in descending order. Based on the comparison at step 212, a corresponding filter 124 is selected according to which of the secondary thresholds has been met, in this example, where the environment indicator E lies relative to the set of secondary thresholds $B_i$.

In the example shown in FIG. 11, there are four deblocking filters 124, each with a corresponding threshold, such that Filter$_1$ is chosen if the environment indicator E is below threshold A and above or equal to the threshold $B_1$, Filter$_2$ is chosen if the environment indicator E is below threshold $B_1$ and above or equal to the threshold $B_2$, Filter$_3$ is chosen if the environment indicator E is below threshold $B_2$ and above or equal to the threshold $B_3$, and Filter$_4$ is chosen if the environment indicator E is below threshold $B_3$. The threshold set decreases in value from $B_1$ being the highest to $B_3$ being the lowest, while the deblocking filter complexity increases from Filter$_1$ being the least complex to Filter$_4$ being the most complex. Other embodiments of filtering and thresholding order may be used. Thus, in this example, if the environmental indicator is greater than threshold $B_1$, meaning there is a sufficient but low amount of processing resources available, then a low complexity deblocking filter, Filter$_1$, will be selected. If the environmental indicator is less than threshold $B_1$ and greater than threshold $B_2$, then a slightly more complex deblocking filter 124, Filter$_2$, will be selected. In the case where the environmental indicator is less than the lowest threshold $B_3$, meaning there is a high amount of available processing resources available, then the most complex deblocking filter 124, Filter$_4$, will be selected. Other embodiments have a plurality of deblocking filters 123 that range in complexity. Other embodiments may also include a plurality of linear or non-linear comparators that use a plurality of thresholds, either held constant or dynamically calculated. In general, the system selects the deblocking filter 124 that is suitable for the amount of available processor loading, while simultaneously generating higher quality visual images.

After selecting the filtering mode, a signal is transmitted to the configuration module 146 in the deblocking filter module 144, where at step 216, the selected deblocking filter 124 is applied to the decoded video flame 128. If the deblocking filtering 124 has been turned off in step 214, then the decoded frame passes through the deblocking filtering module 144 without being filtered. The decoded and filtered video frame is then outputted to the video player in step 218.

It can therefore be seen that by storing and having access to a plurality of deblocking filters 124, the deblocking filter module 144 can utilize the most appropriate complexity for the current system environment. It will be appreciated that the filter select module 142 may be included in the deblocking filter module 144 or may be a separate module or function as shown in FIG. 9.

To utilize the plurality of deblocking filters 124, a method for applying a deblocking filter to a video according to processor usage may be performed. The method comprises determining an environment indicator E indicative of current processor usage; comparing the environment indicator E to a primary threshold, the primary threshold indicative of a maximum acceptable processor usage; if the primary threshold is met, foregoing any deblocking filtering; and if the primary threshold is not met, comparing the environment indicator E to one or more secondary thresholds and applying a respective one of a plurality of deblocking filters to the video according to which of the secondary thresholds is met, each the plurality of deblocking filters having a different complexity.

It will be appreciated that the particular options, outcomes, applications, screen shots, and functional modules shown in

What is claimed is:

1. A method for applying a deblocking filter in a decoding process to frames of a video according to processor usage in a computing device, said method comprising:

a processor of said computing device computing an environment indicator indicative of a current state of said computing device by determining current processor usage, by referencing an expected decoding order of a plurality of future frames beyond a next frame to determine if future processor usage is expected to increase or decrease, and by referencing one or more of a current decode frame rate and a target decode frame rate, to determine if future processor usage is expected to increase or decrease;

said processor comparing said environment indicator to a primary threshold, said primary threshold being indicative of a maximum acceptable processor usage;

if said primary threshold is met, said processor foregoing any deblocking filtering; or if said primary threshold is not met, said processor comparing said environment indicator to one or more secondary thresholds and applying a respective one of a plurality of deblocking filters to said video according to which one of said secondary thresholds is met, each said plurality of deblocking filters having a different complexity.

2. The method according to claim 1 comprising applying said respective one of said plurality of deblocking filters while decoding frames of said video.

3. The method according to claim 2 wherein said method is repeated for each frame of said video.

4. The method according to claim 2 wherein said frames are grouped into intra coded (I), bi-directionally predictive coded (B) and predictive coded (P) frames and said method is repeated for each group of frames in said video.

5. The method according to claim 2 comprising outputting decoded and filtered frames.

6. The method according to claim 1 wherein said environment indicator is determined according to said current processor usage and according to a difference between the target decode frame rate and the current decode frame rate.

7. The method according to claim 6 wherein said difference accounts for video decode compensation procedures being applied based on said current processor usage.

8. The method according to claim 1 wherein said complexity is based on the extent of horizontal and vertical edge filtering applied to edges of blocking artefacts.

9. The method according to claim 1 wherein said plurality of deblocking filters are each distinct with fixed parameters.

10. The method according to claim 1 wherein said plurality of deblocking filters are dynamically programmed by setting an adjustable deblocking filter.

11. A non-transitory computer readable medium for applying a deblocking filter in a decoding process to frames of a video according to processor usage in a computing device; the computer readable medium comprising computer executable instructions executed by a processor of said computing device for:

computing an environment indicator indicative of a current state of said computing device by determining current processor usage, by referencing an expected decoding order of a plurality of future frames beyond a next frame to determine if future processor usage is expected to increase or decrease, and by referencing one or more of a current decode frame rate and a target decode frame rate, to determine if future processor usage is expected to increase or decrease;

comparing said environment indicator to a primary threshold, said primary threshold being indicative of a maximum acceptable processor usage;

if said primary threshold is met, foregoing any deblocking filtering; or if said primary threshold is not met, comparing said environment indicator to one or more secondary thresholds and applying a respective one of a plurality of deblocking filters to said video according to which one of said secondary thresholds is met, each said plurality of deblocking filters having a different complexity.

12. A hardware processor of a computing device configured for applying a deblocking filter in a decoding process to frames of a video according to processor usage, comprising:

said hardware processor configured for executing computer executable instructions on said computing device to:

compute an environment indicator indicative of a current state of said computing device by determining current processor usage, by referencing an expected decoding order of a plurality of future frames beyond a next frame to determine if future processor usage is expected to increase or decrease, and by referencing one or more of a current decode frame rate and a target decode frame rate, to determine if future processor usage is expected to increase or decrease;

compare said environment indicator to a primary threshold, said primary threshold being indicative of a maximum acceptable processor usage;

if said primary threshold is met, forego any deblocking filtering; or if said primary threshold is not met, compare said environment indicator to one or more secondary thresholds and applying a respective one of a plurality of deblocking filters to said video according to which one of said secondary thresholds is met, each said plurality of deblocking filters having a different complexity.

13. The processor according to claim 12 further configured for decoding said video and applying said respective one of said plurality of deblocking filters while decoding frames of said video.

14. The processor according to claim 13 further configured to operate on each frame of said video.

15. The processor according to claim 13 wherein said frames are grouped into intra coded (I), bi-directionally predictive coded (B) and predictive coded (P) frames and said processor is configured to operate on each group of frames in said video.

16. The processor according to claim 13 further configured to output decoded and filtered frames to a video player.

17. The processor according to claim 12 further configured to determine said environment indicator according to said current processor usage and according to a difference between the target decode frame rate and the current decode frame rate.

18. The processor according to claim 17 further configured to account for said difference by applying video decode compensation procedures based on said current processor usage.

19. The processor according to claim 12 further configured to base said complexity on the extent of horizontal and vertical edge filtering applied to edges of blocking artefacts.

20. The processor according to claim 12 wherein said plurality of deblocking filters are each distinct with fixed parameters.

21. The processor according to claim 12 wherein said plurality of deblocking filters are configured to be dynamically programmable by setting an adjustable deblocking filter.

22. The processor according to claim 12, said processor being utilized by a mobile device comprising a video player and a display.

* * * * *